(12) United States Patent
Jang et al.

(10) Patent No.: US 10,935,784 B2
(45) Date of Patent: Mar. 2, 2021

(54) PERSONAL IMMERSIVE DEVICE AND DISPLAY THEREOF

(71) Applicant: LG Display Co., Ltd., Seoul (KR)

(72) Inventors: Sukhyeun Jang, Paju-si (KR); Seungmin Baik, Paju-si (KR); Goeun Jung, Paju-si (KR); Hojin Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 144 days.

(21) Appl. No.: 16/200,339

(22) Filed: Nov. 26, 2018

(65) Prior Publication Data

US 2019/0162955 A1    May 30, 2019

(30) Foreign Application Priority Data

Nov. 28, 2017   (KR) .................. 10-2017-0160720

(51) Int. Cl.
| | |
|---|---|
| *G02B 27/00* | (2006.01) |
| *G02B 27/01* | (2006.01) |
| *G02B 27/09* | (2006.01) |

(52) U.S. Cl.
CPC ..... *G02B 27/0075* (2013.01); *G02B 27/0172* (2013.01); *G02B 27/0922* (2013.01); *G02B 27/0955* (2013.01)

(58) Field of Classification Search
CPC .......... G02B 5/201; G02B 5/20; G02B 5/285; G02B 5/1823; G02B 27/0172; G02B 27/0955; G02B 27/0922; G02B 27/0075; G02B 2027/0129; G02B 2027/0112; G02B 2027/0123; H04N 13/344; H04N 13/327; H04N 13/324; H04N 13/356; H04N 13/351; H04N 13/359
See application file for complete search history.

(56) References Cited

U.S. PATENT DOCUMENTS

| | | | |
|---|---|---|---|
| 7,808,540 B2* | 10/2010 | Cok | ........... H04N 7/144 |
| | | | 348/14.16 |
| 10,290,832 B2 | 5/2019 | Ueda | |
| 2008/0165267 A1* | 7/2008 | Cok | ........... H04N 7/144 |
| | | | 348/333.01 |
| 2011/0136291 A1 | 6/2011 | Iwata et al. | |
| 2014/0301062 A1 | 10/2014 | David et al. | |
| 2015/0001477 A1 | 1/2015 | Namkung | |

(Continued)

FOREIGN PATENT DOCUMENTS

| | | | |
|---|---|---|---|
| CN | 102088026 A | 6/2011 | |
| CN | 106920507 A | 7/2017 | |

(Continued)

*Primary Examiner* — Nikolay K Yushin
(74) *Attorney, Agent, or Firm* — Seed IP Law Group LLP

(57) ABSTRACT

A personal immersive device for virtual reality and/or augmented reality and a display thereof are disclosed. The personal immersive device comprises a plurality of subpixels arranged in a matrix on the substrate; a planarization film applied over an entire surface of a substrate; color filters and light-emitting elements disposed in the respective subpixels, over the planarization film; and an imaging lens that is smaller in size than the substrate and spaced a given distance apart from the substrate, wherein, in the first side area and second side area, the light-emitting elements are misaligned from the color filters.

17 Claims, 9 Drawing Sheets

(56) References Cited

U.S. PATENT DOCUMENTS

| | | |
|---|---|---|
| 2015/0070532 A1 | 3/2015 | Masuda et al. |
| 2017/0154930 A1 | 6/2017 | Kim et al. |
| 2017/0188006 A1 | 6/2017 | Park et al. |
| 2019/0066546 A1 | 2/2019 | Kato et al. |

FOREIGN PATENT DOCUMENTS

| | | |
|---|---|---|
| JP | 2010-56016 A | 3/2010 |
| JP | 2014-526068 A | 10/2014 |
| KR | 10-2007-0052914 A | 5/2007 |
| KR | 10-2009-0003590 A | 1/2009 |
| KR | 10-2011-0058707 A | 6/2011 |
| KR | 10-2013-0000401 A | 1/2013 |
| KR | 10-2015-0003572 A | 1/2015 |
| KR | 10-2015-0086497 A | 7/2015 |
| KR | 10-2015-0096547 A | 8/2015 |
| KR | 10-2017-0062904 A | 6/2017 |
| WO | 2017/169961 A1 | 10/2017 |

\* cited by examiner $\alpha > \beta > \gamma > \delta$

PERSONAL IMMERSIVE DEVICE AND DISPLAY THEREOF

CROSS-REFERENCE TO RELATED APPLICATION

This application claims the benefit of Korea Patent Application No. 10-2017-0160720 filed on Nov. 28, 2017, which is incorporated herein by reference for all purposes as if fully set forth herein.

BACKGROUND

Technical Field

The present disclosure relates to a personal immersive device for virtual reality and/or augmented reality and a display thereof. More particularly, the present disclosure relates to a personal immersive device that is reduced in weight because its lenses are made smaller in size than displays, and a display thereof.

Description of the Related Art

Virtual reality refers to a particular environment and/or situation where the user feels like they are really there by using stereoscopic imaging technology. Virtual reality is being developed to provide auditory, tactile, and visual cues through all the human senses so that the user feels like they are in a real-world environment. Virtual reality devices, which integrate virtual reality technologies, are used in military, architecture, tourism, movies, multimedia, gaming, etc.

A personal immersive device is a device that uses virtual reality technology to enhance the sense of immersion for an individual user experiencing a virtual reality environment. Particularly, its display is considered the most significant element for maximizing visual immersion. Examples of a typical display used in the personal immersive device may include HMD (head mounted display), FMD (face mounted display), EGD (eye glasses-type display), etc. The display of the personal immersive device may be simply referred to as "personal immersive display".

Current personal immersive devices, with an external design similar to goggles, are being developed in such a manner that allow for use by an individual person. However, there is an increasing need for improvements because the stereoscopic depth and sense of immersion in images are not as high as expected. Moreover, long-time use increases the level of fatigue, along with many other problems.

In one of the recently proposed methods, a stereoscopic image is displayed to implement virtual reality in a display on a smartphone, and the user wears the smartphone with a HMD. However, the display on the smartphone is not optimally designed for virtual reality, and therefore this method of displaying a virtual reality image on the smartphone cannot achieve a high level of virtual reality. Aside from the display, the smartphone, with other essential parts, including the battery, becomes too heavy if mounted to a HMD.

BRIEF SUMMARY

The present disclosure reduces the aforementioned problems, and an aspect of the present disclosure is to provide a personal immersive device that improves comfort when worn due to its reduced weight. Another aspect of the present disclosure is to provide a personal immersive device that is reduced in overall weight because its lens, which is the heaviest part, is made smaller in size than a display panel. Still another aspect of the present disclosure is to provide a personal immersive device that has a display panel providing an increase in the amount of light to an imaging lens.

An exemplary embodiment of the present disclosure provides a personal immersive device comprising: a substrate including a central region, a first side area and a second side area with the central region interposed therebetween; a plurality of subpixels arranged in a matrix on the substrate; a planarization film applied over the entire surface of the substrate; color filters and light-emitting elements disposed in the respective subpixels, over the planarization film; and an imaging lens that is smaller in size than the substrate and spaced a given distance apart from the substrate, wherein, in the first side area and second side area, the light-emitting elements are not aligned with the color filters.

In one embodiment, in the central area, the light-emitting elements are in alignment with the color filters.

In one embodiment, the degree of misalignment is greater with the increasing distance from the central area.

In one embodiment, in the first side area and second side area, the light-emitting elements located off the center point of the substrate are misaligned from the color filters by a given distance, and line segments connecting the center points of the light-emitting elements and the center points of the color filters are tilted at a given angle toward the central area.

In one embodiment, in the first side area and second side area, the degree of misalignment between the light-emitting elements located off the center point of the substrate and the color filters gradually increases with the increasing distance from the central area.

In one embodiment, in the first side area and second side area, the planarization film gradually increases in thickness with the increasing distance from the central area.

In one embodiment, the planarization film has a minimum thickness at the center point of the substrate and a maximum thickness at the edges farthest from the center point of the substrate.

In one embodiment, the thickness of the planarization film increases gradually in a linear fashion, from the minimum thickness to the maximum thickness.

In one embodiment, the thickness of the planarization film increases gradually in a curved fashion, from the minimum thickness to the maximum thickness.

In one embodiment, the personal immersive device further comprises a thin-film transistor for each subpixel, under the planarization film, the light-emitting elements each comprising: an anode connected to the thin-film transistor over the planarization film; an organic emission layer stacked over the anode; and a cathode stacked over the organic emission layer.

In one embodiment, the color filters are of uniform size and arranged uniformly at regular intervals across the substrate.

The present disclosure provides a personal immersive device that comprises an imaging lens smaller in size than a display panel. The personal immersive device is highly comfortable to wear because it is reduced in weight by reducing the size of the imaging lens, which is the heaviest part. Moreover, the display panel according to the present disclosure has a structure in which the direction of light toward the imaging lens is adjusted in such a way that all of the light of video information is provided to the imaging lens which is smaller in size than the display panel. As a result, the display panel may provide video information to the imaging lens which is smaller in size than itself, without light loss.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

In the drawings.

DETAILED DESCRIPTION

Figure 1:
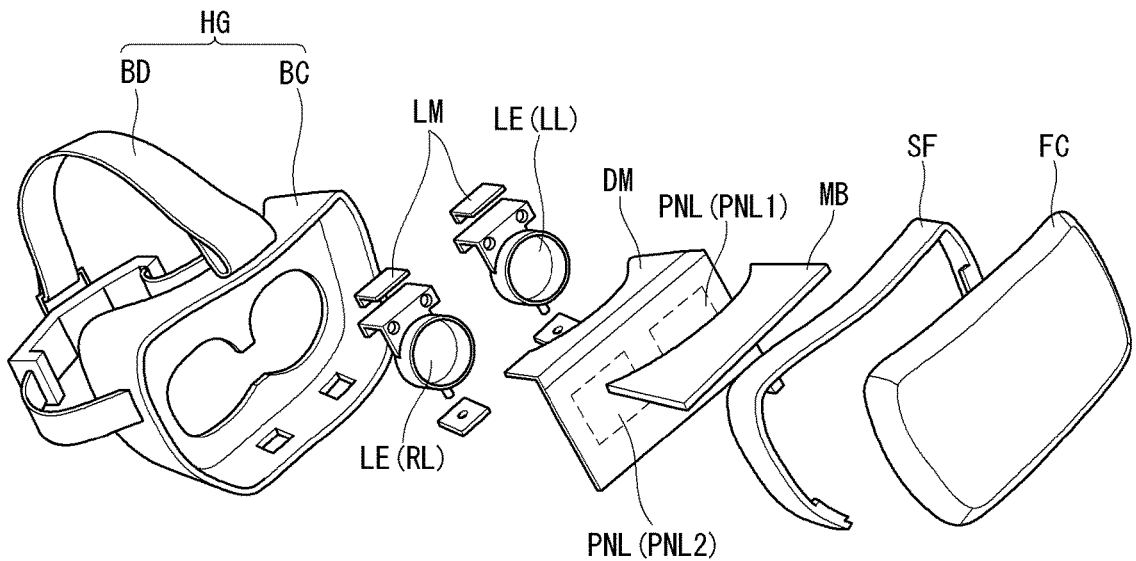
FIG. 1 is a perspective view of a personal immersive device according to the present disclosure.

Various aspects and features of the present disclosure and methods of accomplishing them may be understood more readily by reference to the following detailed descriptions of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the present disclosure to those skilled in the art, and the present disclosure is defined by the appended claims.

The shapes, sizes, proportions, angles, numbers, etc., shown in the figures to describe the exemplary embodiments of the present disclosure are merely examples and not limited to those shown in the figures. Like reference numerals denote like elements throughout the specification.

In describing the present disclosure, detailed descriptions of related well-known technologies will be omitted to avoid unnecessary obscuring the present disclosure. When the terms "comprise", "have", "consist of" and the like are used, other parts may be added as long as the term "only" is not used. The singular forms may be interpreted as the plural forms unless explicitly stated.

The elements may be interpreted to include an error margin even if not explicitly stated. When the position relation between two parts is described using the terms "on", "over", "under", "next to" and the like, one or more parts may be positioned between the two parts as long as the term "immediately" or "directly" is not used.

It will be understood that, although the terms "first", "second", etc., may be used herein to describe various elements, these elements are not limited by these terms. These terms are used to distinguish one element from another element. The terms and names of elements used herein are chosen for ease of description and may be different from the names of parts used in actual products.

The features of various exemplary embodiments of the present disclosure may be coupled or combined with one another either partly or wholly, and may technically interact or work together in various ways. The exemplary embodiments may be carried out independently or in connection with one another.

Hereinafter, various exemplary embodiments of the present disclosure will be described in detail with reference to the accompanying drawings. In the exemplary embodiments below, the description of an electroluminescence display will focus on an organic light-emitting display comprising organic light-emitting material. However, it should be noted that the technical idea of the present disclosure is not limited to organic light-emitting displays but also may apply to inorganic light-emitting displays comprising inorganic light-emitting material.

FIG. 1 is a perspective view of a personal immersive device according to the present disclosure. Referring to FIG. 1, a personal immersive device according to the present disclosure comprises a lens module LM, a display module DM, a mainboard MB, a head gear HG, a side frame SF, a front cover FC, etc.

The display module DM comprises display panels PNL and a display panel drive circuit for driving the display panels PNL and displays an input image received from the mainboard MB. The display panel is divided into a first display panel PNL1 which is seen from the user's left eye and a second display panel PNL2 which is seen from the user's right eye. The display module DM displays image data fed from the mainboard MB on the display panels PNL1 and PNL2. The image data may be 2D or 3D image data for creating video images of virtual reality (VR) or augmented reality (AR). The display module DM may display various information fed from the mainboard MB in text form, symbolic form, etc.

The lens module LM comprises imaging lenses LE where the angle of view of the screen presented to the user's left and right eyes is wider than the field of view of the user's left and right eyes. A pair of fisheye lenses, a type of super wide-angle lenses for widening the screen's viewing angle, may be used as the imaging lenses LE. The pair of fisheye lenses comprises a left-eye lens LL placed in front of the first display panel PNL1 and a right-eye lens RL placed in front of the second display panel PNL2.

The mainboard MB comprises a processor that executes virtual reality software and delivers a left-eye image and a right-eye image to the display module DM. Moreover, although not shown, the mainboard MB may further comprise an interface module, a sensor module, etc., that are connected to external devices. The interface module is connected to external devices via interfaces such as Universal Serial Bus (USB), High-Definition Multimedia Interface (HDMI), etc. The sensor module comprises various sensors such as a gyro-sensor, an acceleration sensor, etc.

The processor at the mainboard MB corrects left-eye and right-eye image data in response to an output signal from the sensor module, and transmits left-eye and right-eye image data of an input image received via the interface module to the display module DM. The processor may create a left-eye image and right-eye image matching the resolution of the display panel based on a result of analysis of depth information from 2D or 3D images and transmit them to the display module DM.

The head gear HD comprises a back cover BC exposing only the left-eye lens LL and the right-eye lens RL to the user's eyes and a band BD connected to the back cover BC. The back cover BC of the head gear HG, the side frame SF, and the front cover FC are assembled to provide an internal space where the components of the personal immersive device are placed and to protect these components. The components comprise the lens module LM, the display module DM, and the mainboard MB. The band BD is connected to the back cover BC. The user can wear the personal immersive device on their head by using the band BD. Once the personal immersive device is put on their head, the user sees the different display panels PNL1 and PNL2 from the left and right eyes through the fisheye lenses LL and RL.

The side frame SF is fixed between the head gear HG and the front cover FC, making a gap in the internal space where the lens module LM, the display module DM, and the mainboard MB are placed. The front cover FC is placed on the outer surface of the personal immersive device.

The personal immersive device of this disclosure may be implemented in an HMD (head mounted display) structure shown in FIG. 1, but is not limited to it. For example, the present disclosure may be designed as an EGD (eye glasses-type display).

Figure 2:
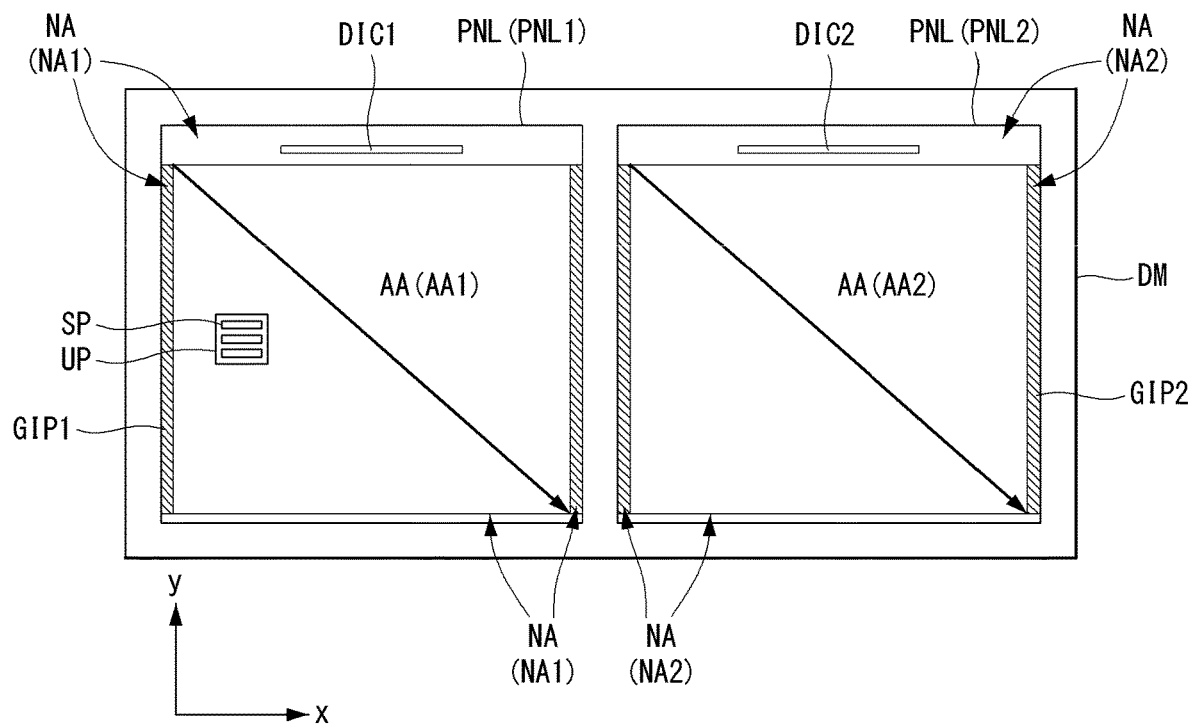
FIG. 2 is a view of first and second display panels in the display module of FIG. 1.
Figure 3:
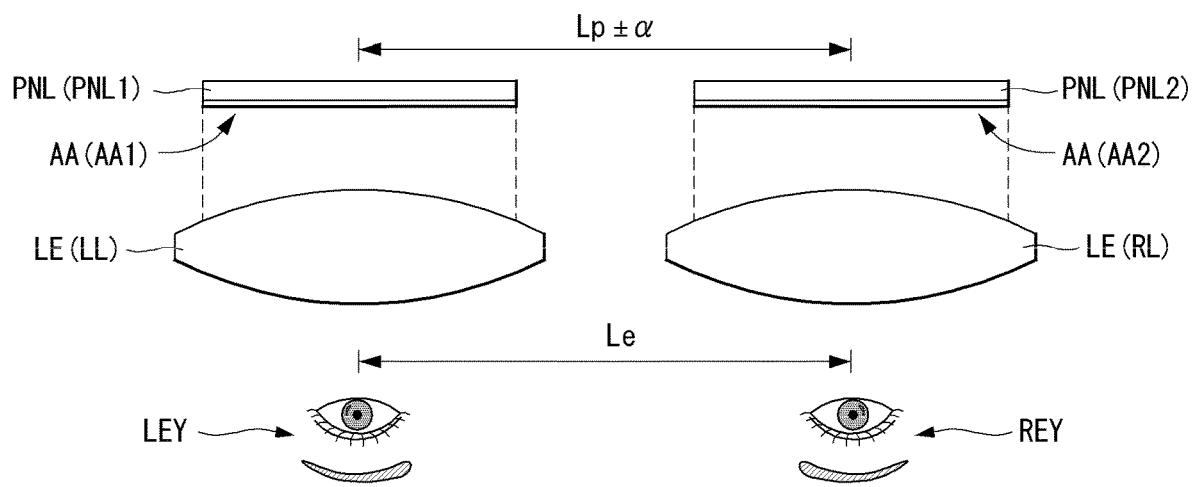
FIG. 3 is a view of the distance between the first and second display panels of FIG. 2.

FIG. 2 is a view of first and second display panels PNL1 and PNL2 in the display module DM of FIG. 1. FIG. 3 is a view of the positional relationship among the first and second display panels PNL1 and PNL2 of FIG. 2, the lenses LL and RL, and the user's eyes.

The first and second display panels PNL1 and PNL2 may be implemented as organic light-emitting diode (or "OLED") display panels which have fast response time, excellent color reproduction, and wide viewing angle. In the case of EGD mainly used for augmented displays, the display function is usually only available to either the left or right eye. In this case, the display panels PNL may be implemented as transparent organic light-emitting diode display panels. However, the display panels PNL are not limited to them, but flat display panels such as liquid-crystal display panels or electrophoretic display panels may be used.

Referring to FIGS. 2 and 3, in a virtual reality device that provides individual images to both eyes, the first and second display panels PNL1 and PNL2 are manufactured separately and placed a given distance apart on the display module DM. The first and second display panels PNL1 and PNL2 each have a display area AA and a non-display area NA. A pixel data of the input image is written in the pixels of the display area AA so that the input image is reproduced on the display area AA. For example, the first display panel PNL1 comprises a first display area AA1 placed in the center and a first non-display area NA1 surrounding the first display area AA1. Likewise, the second display panel PNL2 comprises a second display area AA2 placed in the center and a second non-display area NA2 surrounding the second display area AA2.

In the first and second display areas AA1 and AA2, a plurality of pixels are arranged in a matrix. Drive circuits for driving the pixels in the display areas AA1 and AA2 are placed in the first and second display areas AA1 and AA2. For example, the drive circuits may comprise DICs (or drive integrated circuits) and GIPs (or gate-in panels).

A DIC (Drive Integrated Circuit) is an IC chip integrated with a timing controller and a data driver. A GIP (Gate In Panel) is a circuit in which a gate driver and an EM driver are integrated on the same substrate along with a pixel array. A first DIC DIC1 and a first GIP GIP1 are placed in the first non-display area NA1 of the first display panel PNL1 and provide a left-eye image to the pixels in the first display area AA1. A second DIC DIC2 and a second GIP GIP2 are placed in the second non-display area NA2 of the second display panel PNL2 and provide a right-eye image to the pixels in the second display area AA2.

The center of the first display area AA1 of the first display panel PNL1 and the center of the second display area AA2 of the second display panel PNL2 are spaced out at substantially the same distance as the distance Le between the two eyes of the user. For example, the distance Lp between the center of the first display area AA1 and the center of the second display area AA2 may be set to Le±α. The distance Le between the user's two eyes, although it may vary depending on various factors, such as the size of a user, their sex, race, facial shape or others factors is approximately 6.5 cm (=65 mm), which is the distance between the left pupil LEY and the right pupil REY. α is a design margin which is added to take into account the display panel drive circuit placed between the first display area AA1 and second display area AA2, process deviation, etc., and may be set to 10% of Le.

The first display area AA1 and second display area AA2 have a landscape aspect ratio, which is longer along the horizontal axis x than on the vertical axis y, with the vertical viewing angle and the horizontal viewing angle taken into account. The viewing angle of personal immersive displays can be improved greatly when the horizontal viewing angle becomes wider than the vertical viewing angle. In the present disclosure, the first and second display panels PNL1 and PNL2 are manufactured as landscape ratio organic-light emitting diode display panels to maximize the horizontal viewing angle of personal immersive displays.

In the landscape aspect ratio, the number of pixels on the horizontal axis x is greater than the number of pixels on the vertical axis y, and the length of the horizontal axis x is longer than the length of the vertical axis y. Meanwhile, in a portrait aspect ratio, the number of pixels on the vertical axis y is greater than the number of pixels on the horizontal axis x, and the length of the vertical axis y is longer than the length of the horizontal axis x.

In the display area AA, a plurality of unit pixels UP are arranged in a matrix. A unit pixel UP may have a rectangular or square shape. Particularly, the unit pixel UP comprises three or four subpixels SP. A subpixel SP may have the shape of a rectangle whose one side is longer than the other. For example, if three subpixels SP form a unit pixel UP, the ratio of the short side to the long side of the subpixels SP may be approximately 1:3. As shown in FIG. 2, the long side of the subpixels SP may run along the X axis, and the short side thereof may run along the Y axis. In other methods, the long side may run along the Y axis, and the short side may run along the X axis.

In the personal immersive device, fisheye lenses LL and RL exist between the user's two eyes LEY and REY and the display panels PNL1 and PNL2, and the distance between the user's two eyes LEY and REY and the display panels PNL1 and PNL2 is very short—that is, several centimeters. The display panels PNL1 and PNL2 are placed adjacent to the user's two eyes LEY and REY to provide a display image wider than the user's field of view so that the user feels as if they are in a real world while viewing the display screen.

Simply placing the display panels close to the user's eyes will only make the user look at the screen at a very close range, and it makes difficult for the user to perceive images properly. Particularly, the edges of the display panels also will be perceived, thus decreasing the sensation of reality. A sensation of reality can be achieved not only by placing the display panels close to the eyes, but also by placing the imaging lenses LE such as fisheye lenses LL and RL between the display panels PNL1 and PNL2 and the user's two eyes LEY and REY. When the user views a reproduced image on the display panels through the imaging lenses, the image is magnified 4 to 5 times the actual screen displayed on the display panels.

When the imaging lenses LE provide a magnified image on the display panel PNL, it is desirable that the imaging lenses LE are larger in size than the display panels PNL in order to make the lenses produce as small a distortion as possible. It is desirable to magnify an image by using the center of the lenses, because image distortion produced by the lenses is much more severe at the edges of the lenses. However, fisheye lenses of the type of imaging lenses LE are considerably thick. Thus, the lenses will become quite heavy if they are made bigger in size than the display panel PNL. As a result, the personal immersive device becomes heavy, which causes discomfort when worn.

The personal immersive device is a device the user wears directly on the body like glasses, and it is desirable if it is lightweight. In the personal immersive device, the parts associated with the display function take up the largest share of the weight of the personal immersive device. For example, the display panels PNL and the imaging lenses LE are the heaviest of all parts. To minimize the weight of the display panel PNL, it is desirable to use an organic light-emitting diode display, the most lightweight display panel ever.

Figure 4:
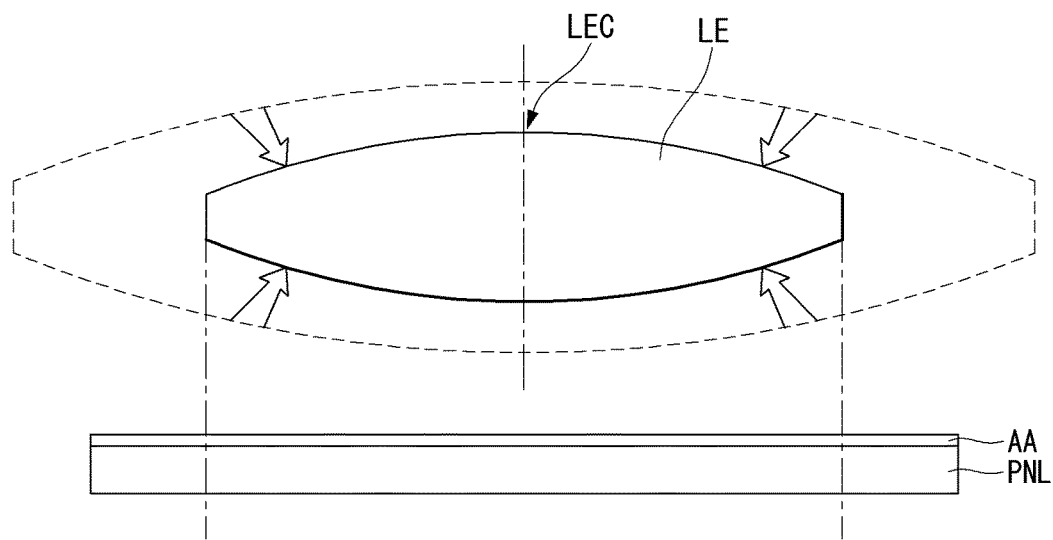
FIG. 4 is a schematic view of a personal immersive device according to the present disclosure, in which an imaging lens is made smaller in size than a display panel.

Referring to FIG. 4, the present disclosure describes a personal immersive device that is reduced in overall weight by making imaging lenses LE, which are the heaviest parts in the personal immersive device, as small as possible. FIG. 4 is a schematic view of a personal immersive device according to the present disclosure, in which the imaging lens is made smaller in size than the display panel. FIG. 4 focuses on the imaging lens LE which is the heaviest part.

Referring to FIG. 4, in the personal immersive device according to the present disclosure, the imaging lens LE is smaller in size than the display panel PNL. The imaging lens LE is disposed opposite the surface where the display area AA on the display panel PNL is defined. It is particularly desirable that the center of the imaging lens LE coincides with the center of the display area AA of the display panel PNL. In the present disclosure, the amount of reduction of the size of the imaging lens LE depends on the optical characteristics of the elements disposed in the display area AA of the display panel PNL and the structure of the pixels.

In the exemplary embodiments below, a description will be given about which structure the elements disposed in the display area AA has in order to reduce the size of the imaging lens LE. In the description and reference drawings below, this structure will be described with respect to a single display panel and a single imaging lens. This structure may be applied to an augmented reality device using a display panel for one eye and an imaging lens for one eye. Moreover, in a virtual reality device using display panels for both eyes and imaging lenses for both eyes, the same structure may be applied to two display panels for two eyes and two imaging lenses for two eyes.

First Exemplary Embodiment

Figure 5:
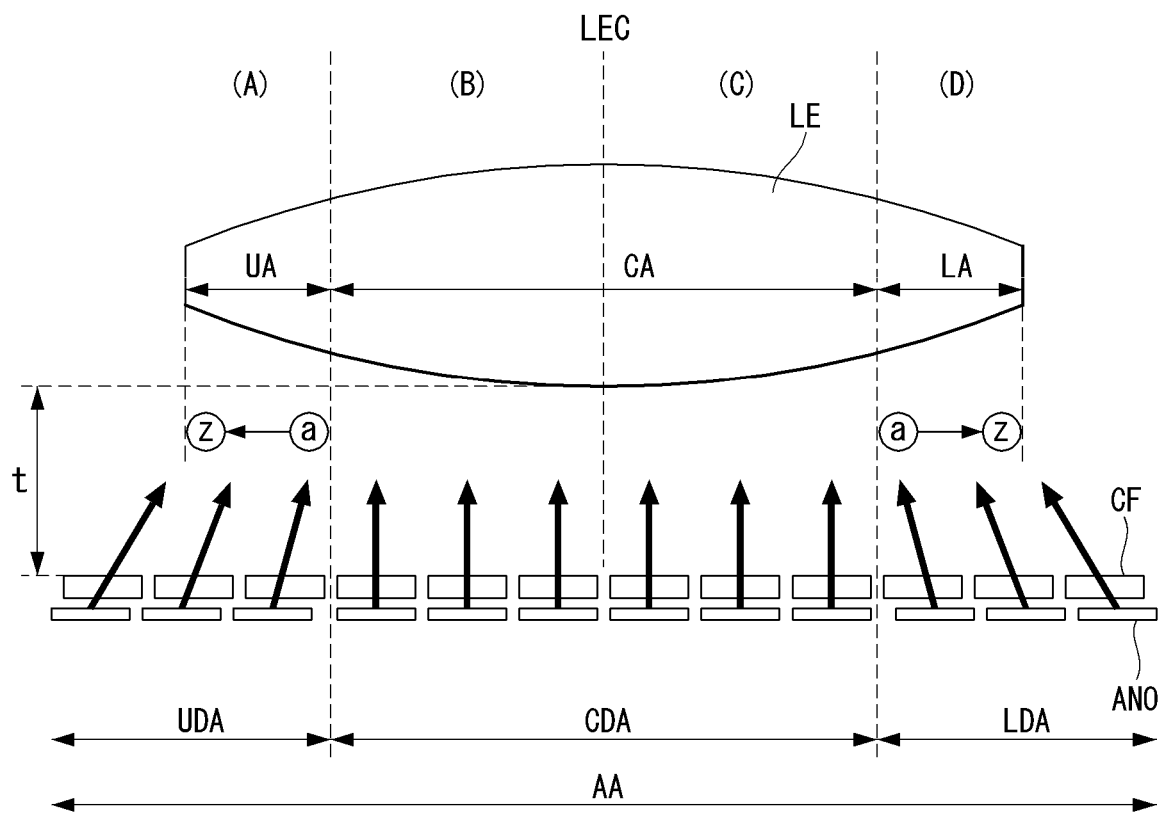
FIG. 5 is a cross-sectional view of the relationship between an imaging lens and a display panel, in a personal immersive device according to a first exemplary embodiment of the present disclosure.
Figure 6:
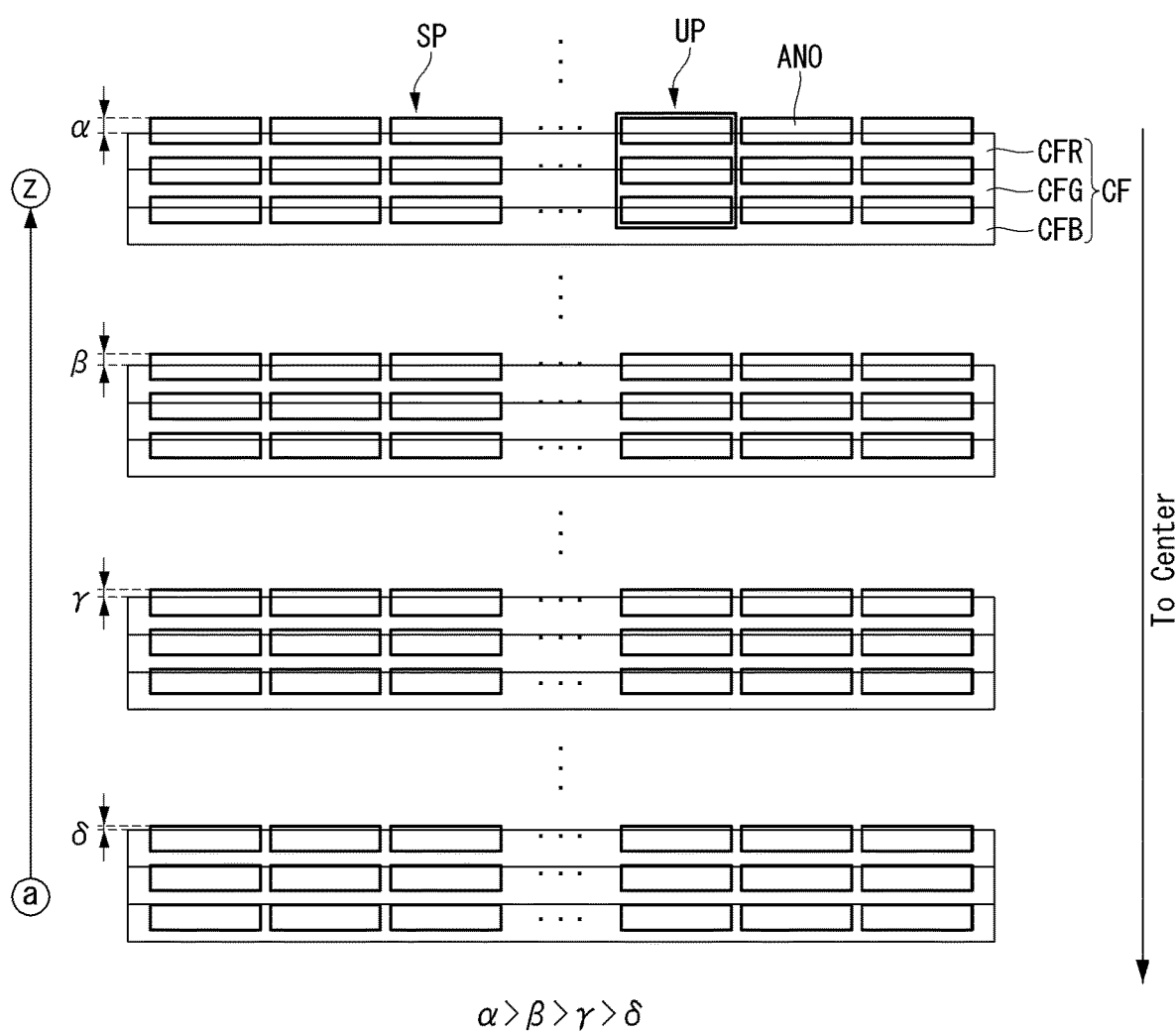
FIG. 6 is an enlarged plan view of the positional relationship between color filters and anodes on a display panel for the personal immersive device according to the first exemplary embodiment of the present disclosure.
Figure 7:
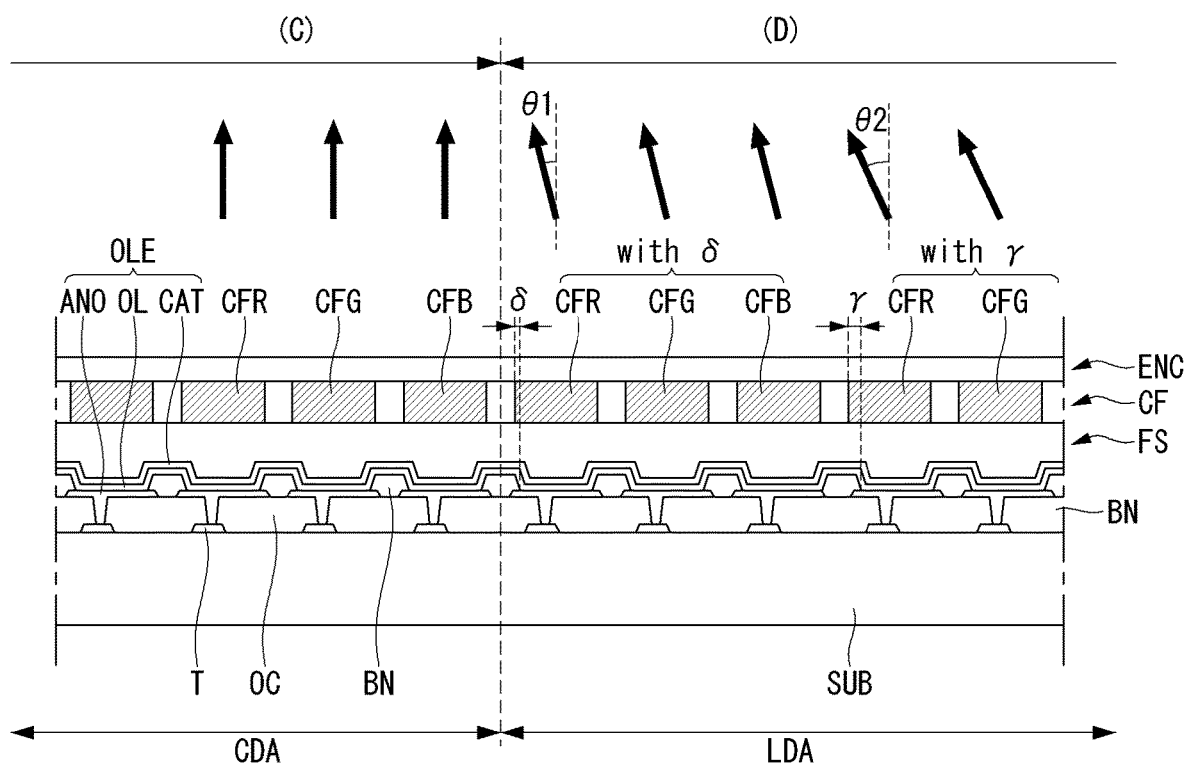
FIG. 7 is an enlarged cross-sectional view of a structure of the display panel for the personal immersive device according to the first exemplary embodiment of the present disclosure.

Hereinafter, a first exemplary embodiment of the present disclosure will be described with reference to FIGS. 5 to 7. FIG. 5 is a cross-sectional view of the relationship between an imaging lens and a display panel, in a personal immersive device according to a first exemplary embodiment of the present disclosure. FIG. 6 is an enlarged plan view of the positional relationship between color filters and anodes on a display panel for the personal immersive device according to the first exemplary embodiment of the present disclosure. FIG. 7 is an enlarged cross-sectional view of a structure of the display panel for the personal immersive device according to the first exemplary embodiment of the present disclosure.

Referring to FIG. 5, the personal immersive device according to the first exemplary embodiment of the present disclosure comprises a display panel PNL and an imaging lens LE. A display area AA in which the input image is reproduced is defined on the display panel PNL. The imaging lens LE is spaced apart from the display area AA of the display panel PNL by a given distance t. The imaging lens LE is smaller in size than the display area AA of the display panel PNL. The center of the imaging lens LE is aligned to coincide with the center of the display area AA.

The imaging lens LE may be divided into a central area CA, a first side area UA, and a second side area LA. The central area CA refers to an area that extends a given distance to both sides from the center point LEC. The first side area UA of the imaging lens LE is an area adjacent to one margin of the central area CA, and the second side area LA of the imaging lens LE is an area adjacent to the other margin of the central area CA, which is symmetrical with the first side area UA. For example, the central area CA of the imaging lens LE may correspond to the center are CDA of the display panel PNL, the first side area UA of the imaging lens LE may correspond to the first side area UDA of the display area AA, and the second side area LA may correspond to the second side area LDA of the display panel PNL. The first side area UDA of the display area AA may be the upper side or the left side of the display area AA, and the second side area LDA of the display area AA may be the lower side or the right side of the display area AA.

In FIG. 5, the imaging lens is divided into four areas for convenience; it may also be divided into 3, 5, 6, 7 or a gradient of areas. For simplicity of explanation, and embodiment with four areas will be described. The imaging lens LE has symmetry with respect to the center point LEC. For example, the imaging lens LE may comprise a first area A, a second area B, a third area C, and a fourth area D. Here, the second area B and the third area C may be defined as the central area CA, the first area A may be defined as the first side area UA, and the fourth area D may be defined as the second side area LA.

Likewise, the display panel PNL may be divided into areas UDA, CDA and LDA corresponding to the areas UA, CA and LA of the imaging lens LE. On the substrate of the display panel PNL, the display area AA may be divided into a central area CDA and a first side area UDA and an second side area LDA opposite to each other with the central area CDA therebetween. For example, the center area CDA of the display panel PNL may be defined to correspond to the central area CA of the imaging lens LE, the first side area UDA of the display panel PNL may be defined to correspond to the first side area UA of the imaging lens LE, and the second side area LDA of the display panel PNL may be defined to correspond to the second side area LA of the imaging lens LE.

Since the imaging lens LE is smaller in size than the display panel PNL, a path of light coming from the display panel PNL can be adjusted in order to improve the transmission of the light coming from the display panel PNL that is provided to the surface of the imaging lens LE. For example, the center area CDA of the display panel PNL provides light directly to the first area A and second area B of the imaging lens LE. On the other hand, the first side area UDA of the display panel PNL provides light to the first side area UA of the imaging lens LE. The second side area LDA of the display panel PNL provides light to the second side area LA of the imaging lens LE.

To this end, the first embodiment proposes an arrangement structure in which the mutual alignment relationship between the anode electrode ANO and the color filter CF is modified according to the positions of the display area AA and the imager lens LE. For example, a plurality of unit pixels UP are arranged in a matrix on the display panel PNL. Each unit pixel UP comprises three subpixels SP representing red, green, and blue. Each subpixel SP comprises a color filter CF and an anode ANO of an organic light-emitting diode. The subpixels SP are the same size and spaced at regular intervals. That is, the color filters CF are distributed at regular intervals in the display area AA.

In contrast, the anodes ANO are arranged in a different arrangement structure from the color filters CF. For example, the anodes ANO in the central area CDA are in alignment with the color filters CF. On the other hand, the anodes ANO in the first side area UDA and the second side area LDA are out of alignment (or in misalignment) from the color filters CF. More specifically, the anodes ANO and color filters CF in the first side area UDA are disposed in such a way that an extension lines connecting the center of the anode electrode ANO and the center of the color filter CF are tilted at a first angle to the right towards the center point LEC of the imaging lens LE, as indicated by the arrows in FIG. 5. Likewise, the anodes ANO and color filters CF in the second side area LDA are disposed in such a way that an extension lines connecting the center of the anode electrode ANO and the center of the color filter CF are tilted at a second angle to the left towards the center point LEC of the imaging lens LE, as indicated by the arrows in FIG. 5. The color filters CF are thus not aligned with the anode electrode on the first and second sides.

FIG. 5 shows an example of a constant degree of misalignment between the anodes ANO and color filters CF in the first side area UDA and second side area LDA. However, it is desirable that the degree of misalignment between the anodes ANO and the color filters CF increases with the increasing distance from the center point LEC of the imaging lens LE. For example, ⓐ in FIG. 5 denotes the closest subpixel SP in the second side area LA to the central area CDA, and ⓩ in FIG. 5 denotes the farthest subpixel SP in the second side area LDA from the central area CDA. That is, it is desirable that the degree of misalignment increases gradually from ⓐ to ⓩ.

Referring to FIG. 6, an example of variation in the degree of misalignment will be described below in details. The display panel PNL has the shape of a rectangle with an X-axis and a Y-axis. The display panel PNL may have the shape of a landscape whose X-axis side is longer than the Y-axis side. In the display area AA of the display panel PNL, a plurality of unit pixels UP are arranged in a matrix. A single unit pixel UP may have the shape of a square whose X-axis side and Y-axis side are equal. A single unit pixel UP comprises three subpixels SP. A single subpixel SP may have the shape of a rectangle whose ratio of the X-axis side to the Y-axis side is 3:1.

Either a red color filter CFR, a green color filter CFG, or a blue color filter CFB may be allocated to each of the three subpixels SP. The red color filter CFR, green color filter CFG, and blue color filter CFB may have the shape of a strip that runs across the display area AA. The subpixels may be defined by their anodes ANO. In FIG. 6, the subpixels SP may represent the anodes ANO.

The red color filter CFR, green color filter CFG, and blue color filter CFB may alternate with one another in succession. On the other hand, the anodes ANO each have the shape of a rectangle defining one subpixel SP.

FIG. 6 is an enlarged plan view of the second side area LDA of the display area AA shown in FIG. 5. For convenience, the subpixels SP in the second side area LDA, taken along the line ⓐ-ⓩ, are represented by four pixel rows. The row of unit pixels UP located farthest from the center point of the display area AA, i.e., the center point LEC of the imaging lens LE, may be misaligned from the color filters by α. Here, all three subpixels SP constituting a unit pixel UP alike may be misaligned from the color filters CFR, CFG, and CFB by α.

On the other hand, the row of unit pixels UP located closest to the center point of the display area AA, i.e., the center point LEC of the imaging lens LE, may be misaligned from the color filters by δ. Here, all three subpixels SP constituting a unit pixel UP alike may be misaligned from the color filters CFR, CFG, and CFB by δ.

Likewise, the row of unit pixels UP located second closest to the center point of the display area AA, i.e., the center point LEC of the imaging lens LE, may be misaligned from the color filters by γ. Also, the row of unit pixels UP located second farthest from the center point of the display area AA, i.e., the center point LEC of the imaging lens LE, may be misaligned from the color filters by β. That is, the anodes ANO are arranged in such a manner that the degree of misalignment increases gradually in the order α>β>γ>δ with the increasing distance from the center point LEC of the imaging lens LE.

Referring to FIG. 7, a personal immersive device comprising an organic light-emitting diode display according to the first exemplary embodiment of the present disclosure will be described. For convenience, the description will be given focusing on the positional relationship between the anodes and color filters formed in the organic light-emitting diode display. A description of other elements, including imaging lenses, will be omitted unless necessary.

A display for the personal immersive device according to the first exemplary embodiment of the present disclosure comprises a self-emitting display such as an organic light-emitting diode display. For example, a plurality of subpixels SP are arranged in a matrix on a transparent substrate SUB. Each subpixel SP has a thin-film transistor T. The thin-film transistor T may comprise a switching thin-film transistor, a driving thin-film transistor, and a compensating thin-film transistor. Here, the main concepts of the present disclosure are not based on the configuration of the thin-film transistors, so only one thin-film transistor will be illustrated for convenience and type of light generating pixel or subpixel circuit can be used.

A planarization film OC is stacked over the thin-film transistor T to cover the entire surface of the substrate SUB. Contact holes exposing part of the thin-film transistor T are formed in the planarization film OC. Anodes ANO are formed over the planarization film OC.

One anode ANO is disposed in each subpixel SP, and is connected to the thin-film transistor T. A bank BN is formed over the surface of the substrate SUB where the anode ANO is formed. An opening is formed in the bank BN to define a light-emitting region at the anode ANO. That is, a portion of the anode ANO exposed by the bank BN is defined as a light-emitting region.

An organic emission layer OL and a cathode CAT are sequentially stacked over the entire surface of the substrate SUB where the bank BN is formed. In the light-emission region defined by the bank BN, an organic light-emitting diode OLE is formed by sequentially stacking the anode ANO, the organic emission layer OL, and the cathode CAT. A passivation layer FS is stacked over the entire surface of the substrate SUB where the organic light-emitting diode OLE is formed. The passivation film FS may be a film that covers the entire surface of the substrate SUB. Alternatively, an inorganic film and an organic film may be alternately stacked to cover the entire surface.

Color filters CF are stacked over the passivation layer FS. The color filters CF comprise red color filters CFR, green color filters CFG, and blue color filters CFB. One color filter is allocated to each subpixel SP. FIG. 7 is an enlarged cross-sectional view of the boundary between the central area CDA and the second side area LDA of the display panel PNL. The subpixels SP in the central area CDA of the display panel PNL provide an image to the third area C of the imaging lens LE, and the subpixels SP in the second side area LDA provide an image to the fourth area D of the imaging lens LE.

In the subpixels SP in the central area CDA of the display panel PNL, the anodes ANO are in alignment with the color filters CFR, CFG, and CFB. On the other hand, in the subpixels SP in the second side area LDA of the display panel PNL, the anodes ANO are misaligned from the color filters CFR, CFG, and CFB. For example, in the three subpixels SP constituting a first unit pixel UP1 located closest to the central area CDA, the anodes ANO are misaligned from the color filters CFR, CFG, and CFB by δ. Particularly, the anodes ANO located just off the central area CA are spaced apart from the color filters CFR, CFG, and CFB by δ.

Moreover, in the three subpixels SP constituting a second unit pixel UP2 adjacent to the first unit pixel UP1, the anodes ANO are misaligned from the color filters CFR, CFG, and CFB by γ. Particularly, the anodes ANO located a little more off the central area CA are spaced apart from the color filters CFR, CFG, and CFB by γ. Although FIG. 7 illustrates three subpixels SP with a misalignment of δ and three subpixels with a misalignment of γ, the present disclosure is not limited to them and more subpixels SP may be included.

Although not shown in FIG. 7, the anodes ANO may be arranged on an area-by-area basis so as to have the misalignment distribution shown in FIG. 6. For example, in the three subpixels located farthest from the central area CA, the anodes ANO may be misaligned from the color filters CFR, CFG, and CFB by α. Moreover, in the three subpixels located second farthest from the central area CA, the anodes ANO may be misaligned from the color filters CFR, CFG, and CFB by β.

In FIG. 7, voids with no hatched pattern in it are placed between the color filters CFR, CFG, and CFB. These voids represent the boundaries between the color filters CFR, CFG, and CFB. In some cases, a black matrix may be arranged between the color filters CFR, CFG, and CFB. Alternatively, the color filters CFR, CFG, and CFB may be placed in succession, without a black matrix in between.

As a result, the light of an image provided by the subpixels SP in the central area CDA of the display panel PNL travels vertically towards the third area C of the imaging lens LE. The light of an image provided by the subpixels SP in the second side area LDA of the display panel PNL travels at a given angle towards the fourth area D of the imaging lens LE. For example, the light of an image provided by the subpixels SP with a misalignment of δ travels at an angle of θ1 from the vertical. Meanwhile, the light of an image provided by the subpixels SP with a misalignment of γ travels at an angle of θ2, which is larger than θ1, from the vertical. As is clear from measurements of a light measuring device, the maximum amount of light is produced along line segments connecting the center points of the anodes ANO and the center points of the color filters CF.

Even if the imaging lens LE, smaller in size than the display panel PNL, is positioned to overlap part of the center of the display panel PNL, all of the light of an image provided by the display panel PNL is provided to the surface of the imaging lens LE. That is, every image on the display panel PNL may be provided to the imaging lens LE even though the imaging lens LE is small in size. Thus, it is possible to minimize the weight of the personal immersive device comprising the display panel PNL and the imaging lens LE according to the first exemplary embodiment of the present disclosure.

The foregoing description of the misalignment structure has been given based on the alignment between an anode ANO and a color filter CF. Here, the anode ANO is employed as a representative element of a light-emitting element. That is, the anode ANO refers to a light-emitting element such as an organic light-emitting diode OLE, more specifically, a light-emitting region exposed by a bank BN at the anode ANO.

Second Exemplary Embodiment

In the first exemplary embodiment, some of the anodes ANO in the display area AA are misaligned from the color filters CF so as to have a path of light focused onto the imaging lens LE. The second exemplary embodiment provides a structure for adjusting the light path more efficiently.

Figure 8:
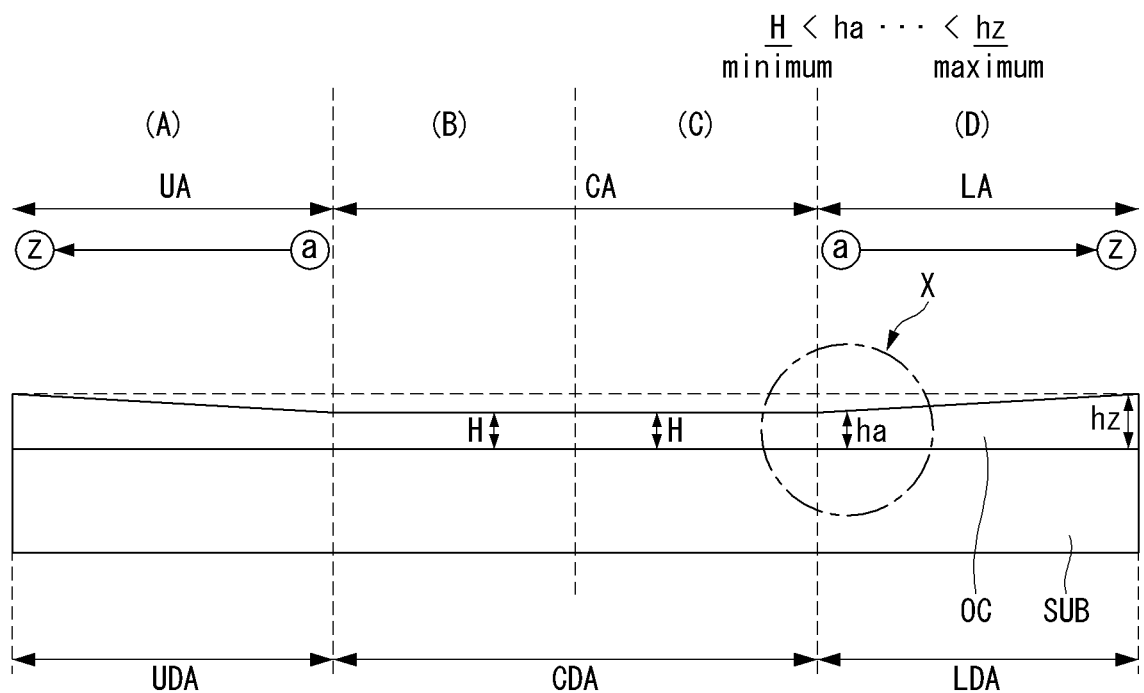
FIG. 8 is a cross-sectional view of a schematic structure of a display panel for a personal immersive device according to a second exemplary embodiment of the present disclosure.
Figure 9:
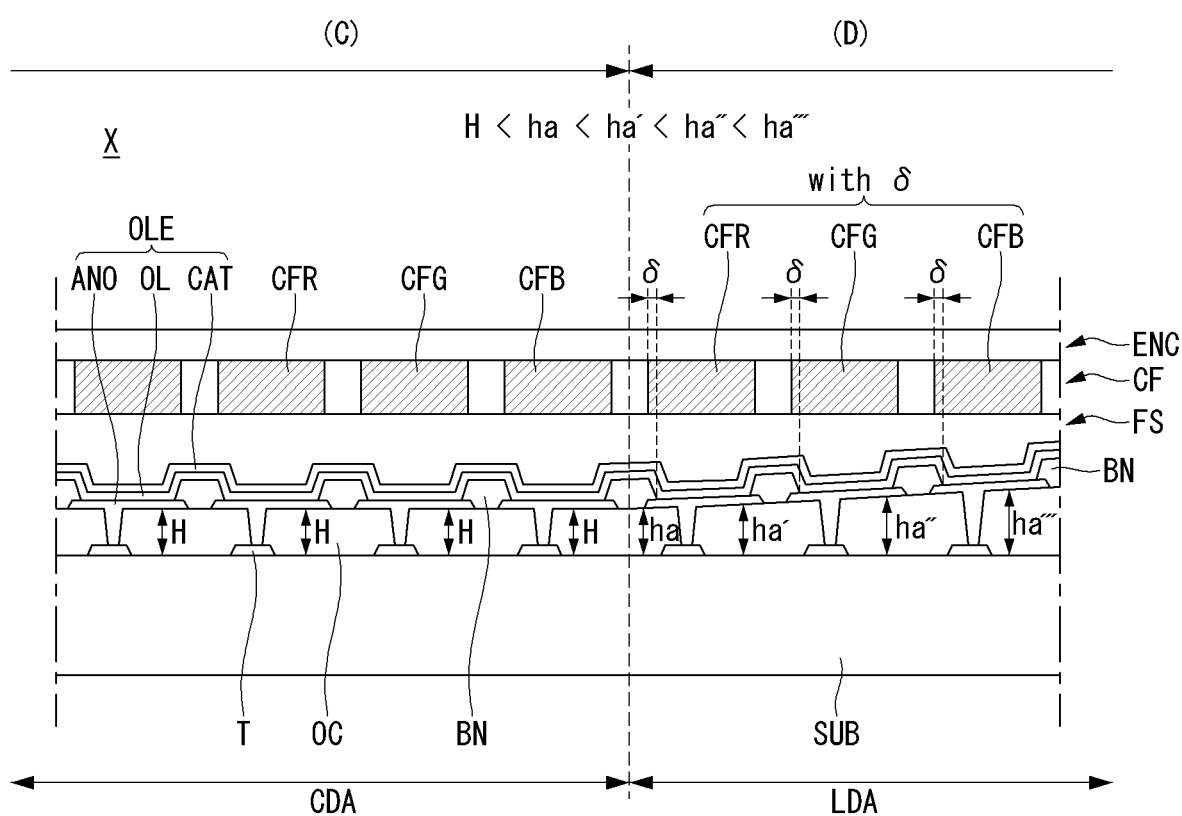
FIG. 9 is an enlarged cross-sectional view of a structure of the display panel for the personal immersive device according to the second exemplary embodiment of the present disclosure.

Hereinafter, a second exemplary embodiment of the present disclosure will be described with reference to FIGS. 8 and 9. FIG. 8 is a cross-sectional view of a schematic structure of a display panel for a personal immersive device according to a second exemplary embodiment of the present disclosure. FIG. 9 is an enlarged cross-sectional view of a structure of the display panel for the personal immersive device according to the second exemplary embodiment of the present disclosure.

Referring to FIG. 8, the display panel PNL of the personal immersive device according to the second exemplary embodiment of the present disclosure comprises an organic light-emitting diode display panel. The display panel PNL according to the second exemplary embodiment of the present disclosure comprises a planarization film OC applied onto the entire surface of the substrate SUB. Although other various elements such as a thin-film transistor and an organic light-emitting diode are included as well, as explained in the first exemplary embodiment, FIG. 8 only shows the planarization film OC, which is the most important element.

The display panel PNL may be divided into a central area CDA, first side area UDA, and an second side area LDA. In the first side area UDA, subpixels are disposed to provide the light of an image to the first area A of the imaging lens LE. In the central area CDA, subpixels are disposed to provide the light of an image to the second area B and third area C of the imaging lens LE. In the second side area LDA, subpixels are disposed to provide the light of an image to the fourth area D of the imaging lens LE.

The planarization film OC has a first thickness H, which is constant, in the central area CDA. On the other hand, the planarization film OC gradually changes in thickness in the first side area UDA and the second side area LDA. For example, the planarization film OC gradually increases in thickness from ⓐ toward ⓩ. In FIG. 8, ⓐ denotes the closest subpixel SP in the second side area LAD to the central area CDA, and ⓩ denotes the farthest subpixel SP in the second side area LDA from the central area CDA. The thickness of the planarization film OC at ⓐ may be denoted by ha, which is greater than the first thickness H. The thickness of the planarization film OC at ⓩ may be denoted by hz. Here, the planarization film OC may gradually increase in thickness from ha to hz.

The applied planarization film OC varies in thickness, with the first thickness H being the minimum, and hz being the maximum. To this end, the planarization film OC is applied at a thickness equal to or greater than hz, which is the maximum thickness, and then patterned and etched using a multi-tone mask with a different contrast level for each area, thereby making the planarization film OC vary in thickness. Thus, the planarization film is not planar on its top surface after the pattern and etching step, but is gradually thinner towards from the edges towards the central region.

Referring to FIG. 9, a description will be given of a specific structure of the organic light-emitting diode display panel with a planarization film OC of varying thicknesses for different positions according to the second exemplary embodiment of the present disclosure. FIG. 9 is an enlarged cross-sectional view of the area 'X' marked by a circle in FIG. 8.

Referring to FIG. 9, the organic light-emitting diode display panel according to the second exemplary embodiment of the present disclosure has almost the same structure as the first exemplary embodiment. The elements are substantially the same as those in the first exemplary embodiment. The only difference is the thickness distribution of the planarization film OC. A detailed description of the same elements will be omitted.

In a display for the personal immersive device according to the second exemplary embodiment, a plurality of subpixels SP are arranged in a matrix on a transparent substrate SUB. Each subpixel SP has a thin-film transistor T. A planarization film OC is stacked over the thin-film transistor T to cover the entire surface of the substrate SUB.

The portion of the planarization film OC formed in the central area CDA has a first thickness H. On the other hand, the portion of the planarization film OC formed in the second side area LDA has a varying thickness.

For example, contact holes exposing part of the thin-film transistor T are formed in the planarization film OC. Anodes ANO are formed over the planarization film OC. In the three subpixels SP constituting a first unit pixel UP1 located closest to the central area CDA, the planarization film OC gradually increases in thickness with the increasing distance from the central area CDA.

For example, in the boundary between the central area CDA and the second side area LDA, the planarization film OC may have a thickness ha, which is slightly greater than the first thickness. The planarization film OC may have a thickness ha' in the first subpixel SP1 located closest to the central area CDA. Also, the planarization film OC may have a thickness ha'' in the second subpixel SP2 adjacent to the first subpixel SP1 and a thickness of ha''' in the third subpixel SP3 adjacent to the second subpixel SP2. Here, the planarization film OC gradually changes in thickness in the order H<ha<ha'<ha''<ha'''.

Along with the variation in the thickness of the planarization film OC, the anodes ANO are aligned differently for each color filter CF and each area. For example, the anodes ANO and the color filters CF may be arranged with the same structure as the first exemplary embodiment. The entire center area CDA is at a constant thickness H and outside this center area, the thickness of the layer OC gradually increases. Therefore, the anodes of each pixel are gradually tilted at slightly greater angles as the distance from the center area CDA increases. This causes the angle of the light emitted therefrom to gradually increase for each pixel as the distance from the center area CDA becomes greater.

As a result, even if the imaging lens LE, smaller in size than the display panel PNL, is positioned to overlap part of the center of the display panel PNL, all the light of an image provided by the display panel PNL is provided to the surface of the imaging lens LE. Thus, it is possible to reduce the weight of the personal immersive device comprising the display panel PNL and the imaging lens LE according to the second exemplary embodiment of the present disclosure.

Third Exemplary Embodiment

Figure 10A:
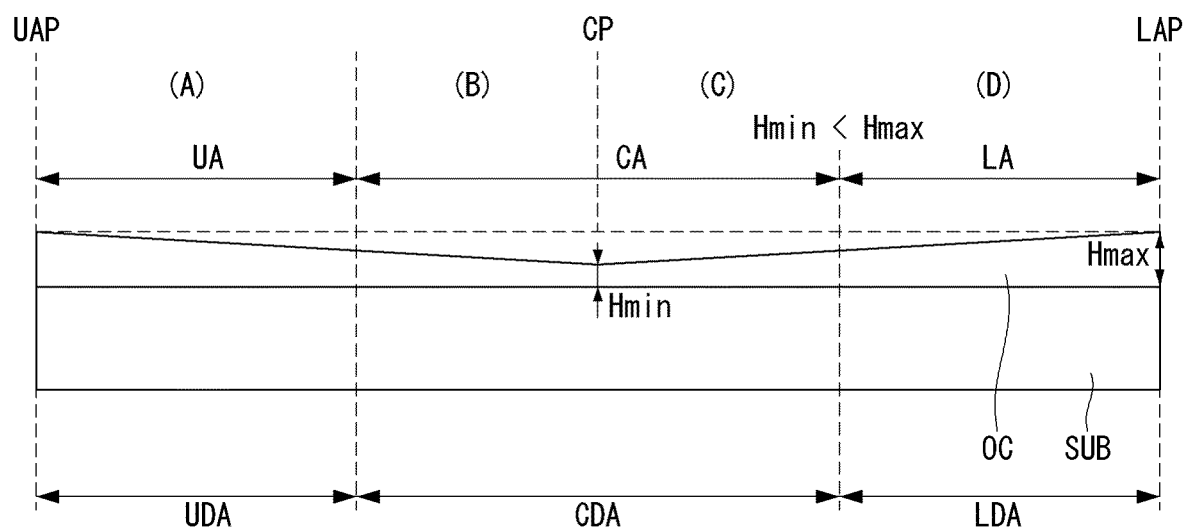
FIGS. 10A and 10B are cross-sectional views of a schematic structure of a display panel for a personal immersive device according to a third exemplary embodiment of the present disclosure.
Figure 10B:
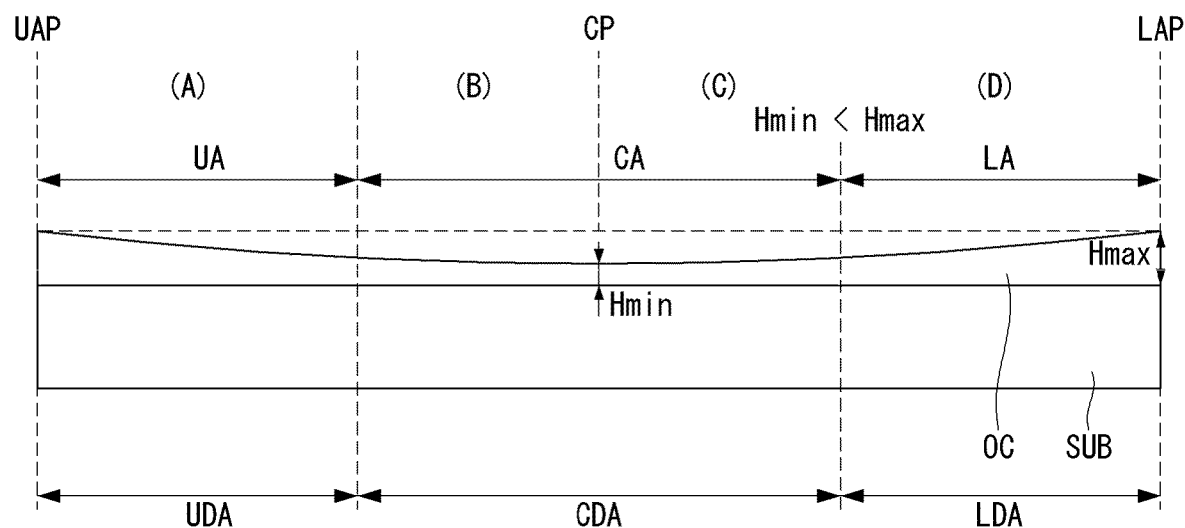

Hereinafter, a third exemplary embodiment of the present disclosure will be described with reference to FIGS. 10A and 10B. The second exemplary embodiment has been described with respect to a personal immersive device comprising an organic light-emitting diode display panel with a planarization film OC of varying thicknesses for different areas of the display panel PNL, in addition to the structure of the first exemplary embodiment. The third exemplary embodiment will be described with respect to a personal immersive device comprising an organic light-emitting diode display panel with a planarization film OC whose thickness changes at a steady rate from a center location rather than from a center area. FIGS. 10A and 10B are cross-sectional views of a schematic structure of a display panel for a personal immersive device according to a third exemplary embodiment of the present disclosure.

Referring to FIGS. 10A and 10B, the display panel PNL of the personal immersive device according to the third exemplary embodiment of the present disclosure comprises an organic light-emitting diode display panel. The display panel PNL according to the third exemplary embodiment of the present disclosure comprises a planarization film OC applied onto the entire surface of the substrate SUB. Although other various elements such as a thin-film transistor and an organic light-emitting diode are included as well, as explained in the first exemplary embodiment, FIG. 8 only shows the planarization film OC for ease of explanation of the main elements of this disclosure. As shown in FIGS. 10A and 10B, The display panel PNL may be divided into a central area CDA, first side area UDA, and an second side area LDA. In the first side area UDA, subpixels are disposed to provide the light of an image to the first area A of the imaging lens LE. In the central area CDA, subpixels are disposed to provide the light of an image to the second area B and third area C of the imaging lens LE. In the second side area LDA, subpixels are disposed to provide the light of an image to the fourth area D of the imaging lens LE.

Particularly, referring to FIG. 10A, the planarization film OC has a minimum thickness Hmin at the center CP corresponding to the center point LEC of the imaging lens LE. On the other hand, the planarization film OC has a maximum thickness Hmax at the edges UAP and LAP of the first side area UDA and second side area LDA. The planarization film OC is applied with a thickness distribution in which its thickness changes at a steady rate between the maximum thickness Hmax and the minimum thickness Hmin.

As explained in the first exemplary embodiment, anodes ANO and color filters CF may be formed over the planarization film OC with the thickness distribution shown in FIG. 10A. In the embodiment of FIG. 10A, in the subpixels SP in the central area CDA of the display panel PNL, the anodes ANO are generally in alignment with the color filters CFR, CFG, and CFB, but might be very slightly off to only a small amount since the change in thickness starts at a central point CP and extends from there, gradually outward to include some regions of the center area CDA. In the subpixels SP in the second side area LA of the display panel PNL, the anodes ANO are misaligned from the color filters CFR, CFG, and CFB to a greater extent.

For example, in the three subpixels SP located closest to the central area CDA, the anodes are misaligned from the color filters by δ. Particularly, the anodes located just off the central area CDA are spaced apart from the color filters by δ. In the three subpixels SP located second closest to the central area CDA, the anodes are misaligned from the color filters by γ. Particularly, the anodes located a little more off the central area CDA are spaced apart from the color filters by γ.

In the three subpixels located farthest from the central area CA, the anodes may be misaligned from the color filters by α. In the three subpixels located second farthest from the central area CDA, the anodes may be misaligned from the color filters by β.

FIG. 10A illustrates that the thickness of the planarization film OC increases gradually in a linear fashion, from the minimum thickness Hmin to the maximum thickness Hmax from a central point CP. FIG. 10B illustrates that the thickness of the planarization film OC gradually increases in a curved fashion, from the minimum thickness Hmin to the maximum thickness Hmax from a central point CP. For example, the planarization film OC may have a thickness that gradually increases in a parabolic or elliptical fashion.

In the second and third exemplary embodiments, the direction of light is adjusted in such a way that all of the light coming from the margins of the display panel PNL reaches the imaging lens LE, which is smaller in size than the display panel PNL, by varying the thickness of the planarization film OC. The variation of the thickness of the planarization film OC may be used in combination with the first exemplary embodiment, or may be used alone without using the first exemplary embodiment, while keeping the anodes in alignment with the color filters. The size of the imaging lens LE may be made even smaller by combining the first exemplary embodiment with the second exemplary embodiment or the third exemplary embodiment.

Example of Application

Figure 11:
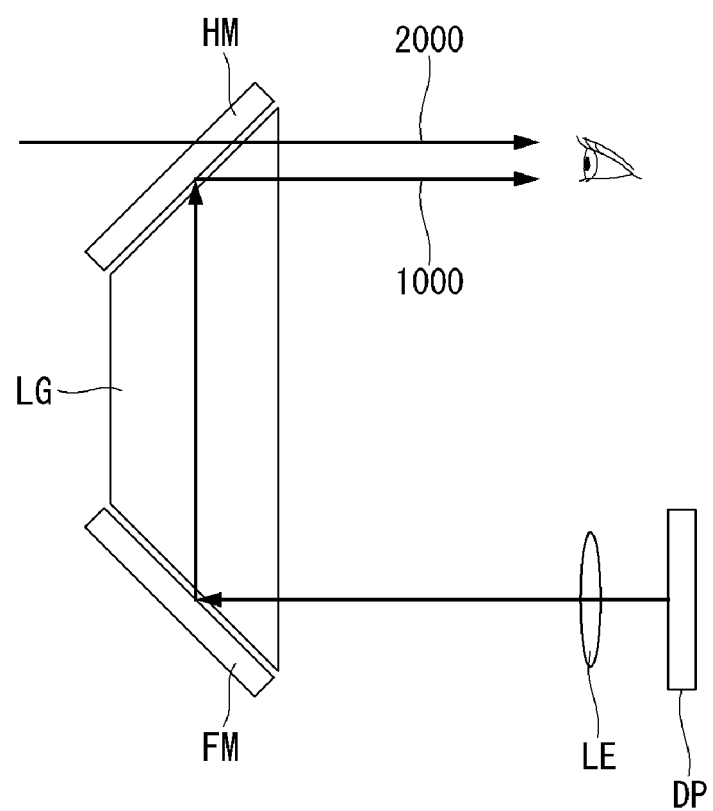
FIG. 11 is a schematic view of a structure of an augmented reality device with a display panel and an imaging lens according to the present disclosure.

Hereinafter, an example personal immersive device with a display panel and an imaging lens according to the present disclosure will be described with reference to FIG. 11. FIG. 11 is a schematic view of a structure of an augmented reality device with a display panel and an imaging lens according to the present disclosure. The display panel and imaging lens according to the present disclosure may be applied to a virtual reality device as well.

Referring to FIG. 11, the augmented reality device according to the present disclosure comprises a display panel DP, an imaging lens LE, a total reflecting mirror FM, a light guide LG, and a semi-transmissive mirror HM. Particularly, it is desirable that the display panel DP has the same structure as explained in the first to third exemplary embodiments. The imaging lens LE is placed in front of the display panel DP. The imaging lens LE is smaller in size than the display panel DP, with its center point coinciding with the center point of the display panel DP.

The total reflecting mirror FM is placed in front of the imaging lens LE. The total reflecting mirror FM reflects the entire image 1000 on the display panel DP that passes through the imaging lens LE and sends it into the light guide LG. The light guide LG delivers the image 1000 on the display panel DP reflected off the total reflecting mirror FM to the semi-transmissive mirror HM without loss.

The semi-transmissive mirror HM reflects the image 1000 on the display panel DP delivered through the light guide LG and sends it to the user's eye. Also, the semi-transmissive mirror HM provides a real-world image 2000 entering from behind, along with the image 1000, to the user's eye. Here, the real-world image 2000 is a user's direct view of a real-world environment. The image 1000 provided by the display panel DP and the real-world image 2000 can be viewed together. That is, useful information may be overlaid as a virtual image 1000 onto the real-world image 2000 and provided as a single image.

In the augmented reality device shown in FIG. 11, the total reflecting mirror FM the light guide LG, and the semi-transmissive mirror HM may be made ultrathin and therefore add only a little weight. The imaging lens LE is the heaviest part in the augmented reality device. Particularly, the overall weight of the augmented reality device can be reduced by including the display panel DP and imaging lens LE according to the present disclosure. The present disclosure provides an augmented reality device that is lightweight and causes no discomfort when worn for a long time.

While the embodiment of the present disclosure has been described in detail with reference to the drawings, it will be understood by those skilled in the art that the disclosure can be implemented in other specific forms without changing the technical spirit or essential features of the disclosure. Therefore, it should be noted that the forgoing embodiments are merely illustrative in all aspects and are not to be construed as limiting the disclosure. The scope of the disclosure is defined by the appended claims rather than the detailed description of the disclosure. All changes or modifications or their equivalents made within the meanings and scope of the claims should be construed as falling within the scope of the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A personal immersive device comprising:
a substrate including a central area, a first side area and a second side area spaced from the first side area, with the central area interposed therebetween, the central, first and second side areas combined being a whole area of the substrate;
a plurality of subpixels arranged in a matrix on the substrate;
a film positioned over an entire surface of the substrate;
color filters and light-emitting elements, each of the color filters and each of the light-emitting elements disposed in a respective subpixel of the plurality of subpixels, the color filters and the light-emitting elements disposed over the film; and
an imaging lens that is smaller in area than the substrate, the imaging lens being spaced apart from the substrate by a given distance,
wherein the imaging lens includes a central region, a first side region, and a second side region,
wherein the central area of the substrate provides light to the central region of the imaging lens,
wherein the first side area of the substrate provides light to the first side region of the imaging lens,
wherein the second side area of the substrate provides light to the second side region of the imaging lens,
wherein all light from the whole area of the substrate is provided into the imaging lens, and
wherein, in the first side area and second side area, the light-emitting elements are misaligned from the color filters.

2. The personal immersive device of claim 1, wherein, in the central area, the light-emitting elements are in alignment with the color filters.

3. The personal immersive device of claim 1, wherein, a degree of misalignment gradually increases with an increasing distance from the central area.

4. The personal immersive device of claim 1, wherein, in the first side area and second side area, the light-emitting elements located off a center point of the substrate are misaligned from the color filters by a given distance, and line segments connecting center points of the light-emitting elements and center points of the color filters are tilted at a given angle toward the central area.

5. The personal immersive device of claim 1, wherein, in the first side area and second side area, a degree of misalignment between the light-emitting elements located off a center point of the substrate and the color filters gradually increases with an increasing distance from the central area.

6. The personal immersive device of claim 1, wherein, in the first side area and second side area, the film gradually increases in thickness with an increasing distance from the central area.

7. The personal immersive device of claim 1, further comprising a thin-film transistor for each of the subpixels, under the film, the light-emitting elements each comprising:
an anode connected to the thin-film transistor over the film;
an organic emission layer stacked over the anode; and
a cathode stacked over the organic emission layer.

8. The personal immersive device of claim 1, wherein the color filters are of uniform size and arranged uniformly at regular intervals across the substrate.

9. The personal immersive device of claim 1, wherein the film has a minimum thickness at a center point of the substrate and a maximum thickness at edges farthest from the center point of the substrate.

10. The personal immersive device of claim 9, wherein a thickness of the film increases gradually in a linear fashion, from the minimum thickness to the maximum thickness.

11. The personal immersive device of claim 9, wherein a thickness of the film increases gradually in a curved fashion, from the minimum thickness to the maximum thickness.

12. A personal immersive device comprising:
a substrate including a central area, a first side area and a second side area spaced from the first side area, with the central area interposed therebetween, the central, first and second side areas combined being a whole area of the substrate;
a plurality of subpixels arranged in a matrix on the substrate, each of the plurality of subpixels having a light emitting area;
color filters and light-emitting elements, each of the color filters and each of the light-emitting elements disposed in a respective subpixel of the plurality of subpixels, the color filter and the light-emitting elements disposed over the light emitting area, the color filters being aligned with respect to locations of the light emitting area in a central area of the substrate and misaligned with respect to locations of the light emitting area in the first side area and the second side area; and
an imaging lens that is smaller in area than the substrate and spaced a given distance apart from the substrate,
wherein the imaging lens includes a central region, a first side region and a second side region,
wherein the central area of the substrate provides light to the central region of the imaging lens,
wherein the first side area of the substrate provides light to the first side region of the imaging lens,
wherein the second side area of the substrate provides light to the second side region of the imaging lens, and
wherein all light from the whole area of the substrate is provided into the imaging lens.

13. The personal immersive device of claim 12, wherein a distance between adjacent light emitting areas of subpixels in first side area is greater than it is in a center area.

14. The personal immersive device of claim 12, further including a film positioned between the substrate and the subpixels.

15. The personal immersive device of claim 14, wherein a thickness of the film is greater in a first side area than in a center area.

16. The personal immersive device of claim 15, wherein the thickness of the film is constant in the center area and gradually increases at location where the first side area is adjacent to the center area to a location where the first side area is spaced from the center area.

17. The personal immersive device of claim 15, wherein the thickness of the film is a first thickness at a center point and gradually increases from the center point towards a first side area and second side area.

* * * * *